United States Patent [19]

Mundy et al.

[11] 3,800,297

[45] Mar. 26, 1974

[54] NON-VOLATILE ASSOCIATIVE MEMORY

[75] Inventors: Joseph L. Mundy; Constantine A. Neugebauer, both of Schenectady, N.Y.

[73] Assignee: General Electric Company, Schenectady, N.Y.

[22] Filed: June 3, 1972

[21] Appl. No.: 267,967

[52] U.S. Cl. .......................................... 340/173 AM
[51] Int. Cl. ....................... G11c 11/40, G11c 15/00
[58] Field of Search .................. 340/173 AM, 172.5

[56] References Cited

UNITED STATES PATENTS

| | | | |
|---|---|---|---|
| 3,723,979 | 3/1973 | Mundy | 340/173 AM |
| 3,713,115 | 1/1973 | Duben | 340/173 AM |
| 3,701,980 | 10/1972 | Mundy | 340/173 AM |
| 3,500,142 | 3/1970 | Kahng | 340/173 R |

*Primary Examiner*—Gareth D. Shaw
*Attorney, Agent, or Firm*—Paul F. Wille; Joseph T. Cohen; Jerome C. Squillaro

[57] ABSTRACT

A non-volatile associative memory cell is disclosed that is suitable for use in universal logic systems, i.e., systems for generating arbitrary Boolean functions. The cell itself utilizes floating gate, field effect transistors for storing information in the form of avalanche injected electric charge. In one embodiment, the memory cell is erasable, in another embodiment, it is not. In an array of these memory cells, the AND function is obtained from the cells comprising a word and the OR function is obtained from cells connecting the words to a common access line. Provision is made for erasing the erasable memory cells singly or en masse.

14 Claims, 5 Drawing Figures

NON-VOLATILE ASSOCIATIVE MEMORY

This invention relates to computer memory cells, and, in particular, to a non-volatile associative memory cell suitable for read only or read mostly operation.

As originally developed, the digital computer is a relatively rigid device, i.e., the logic circuits utilized in the computer are fixed as to the logic function that is performed. Flexibility is achieved through large numbers of such circuits.

To overcome the requirement of having a large number of logic circuits on hand, a "universal logic" system has been long sought. Universal logic enables one to generate arbitrary Boolean functions, i.e., any function, expressed as a sum or product, as desired. The ability to generate arbitrary Boolean functions is important wherever one may desire certain logic functions for only a relatively short time. For example, in "breadboarding" logic systems, where the minimum amount of logic to perform the desired function is not necessarily generated the first time. Another example is in the machine control field where different functions require different, readily changed logic.

In the development of a universal logic system, several interrelated areas are involved. A first is the memory cell, the fundamental unit of the system. A second is the system itself, the organization and arrangement of the cells. A third is the technology required for physically producing the system. The present invention relates generally to the memory cell itself and a system it enables.

The memory cell, or groups of cells, provide the logic connections between a plurality of input and output lines. In a fixed logic system, a memory cell as such is unnecessary since the logic function can be achieved more simply by "hard wiring," the electrical construction of the circuit. However, a memory cell is necessary to achieve the flexibility envisioned for universal logic systems.

Suitable memory cells must meet several requirements that are difficult to achieve simultaneously. For example, the memory cell must be erasable, otherwise the logic is fixed. At the same time, the storage time of the memory cell must be very long. The cell should be able to perform a variety of logic-type connections, e.g., "and," "or," "juncture" and "cut." However, the memory cell should comprise as few elements as possible so that a high cell density can be achieved. High cell density is necessary so that a large number of cells can be fabricated on a single semiconductor chip. As more fully described below, simple logic functions can be performed with just a few cells. However, for a practical system, a large number of cells are necessary to handle the number of possible combinations of the large number input parameters encountered. Thus, cell density can become quite important.

In view of the foregoing, it is therefore an object of the present invention to provide a memory cell suitable for use in universal logic systems.

Another object of the present invention is to provide a memory cell in which information can be stored for extended periods and can be erased.

A further object of the present invention is to provide an associative memory system capable of producing "and" and "or" logic-type responses.

Another object of the present invention is to provide a universal logic system of wide flexibility of operation.

A further object of the present invention is to provide a universal logic system capable of handling a large number of input and output signals with a minimal amount of circuitry.

Another object of the present invention is to provide an associative memory cell utilizing floating gate transistors.

A further object of the present invention is to provide an associative memory system utilizing avalanche injection of charge for both writing and erasing.

The foregoing objects are achieved in the present invention wherein each memory cell comprises two pairs of transistors. Each pair is series connected between first and second access lines, forming a resistive path therebetween. One transistor in the first pair has its gate electrode connected to a third access line and one transistor in the second pair has its gate electrode connected to a fourth access line. The gates of the remaining transistors are permitted to "float," i.e. there is no resistive path to the gate electrode. In one embodiment of the present invention, the gate material is a metal; for example, molybdenum. In this case the memory cell is, as a practical matter, non-erasable. In another embodiment of the present invention, the gate material is a semiconductor; for example, silicon. A memory cell in accordance with this embodiment can be erased quite easily despite the fact that information can be stored almost indefinitely. A modification that can be made to the memory cell of either embodiment is the addition of a voltage variable capacitor for selectively coupling signals to the floating gates.

With either embodiment, information is stored as the presence or absence of an electric charge on the gate of one of the floating gate transistors. Writing is accomplished by avalanche injecting charge from the source to the gate structure. In the embodiment utilizing semiconductor gate material, erasure is accomplished by avalanche injecting charge from the gate structure to the substrate.

A more complete understanding of the present invention can be obtained by considering the following detailed description in conjunction with the accompanying drawings in which:

FIGS. 1 and 2 schematically illustrate the memory cell in accordance with the present invention.

Figure 1:
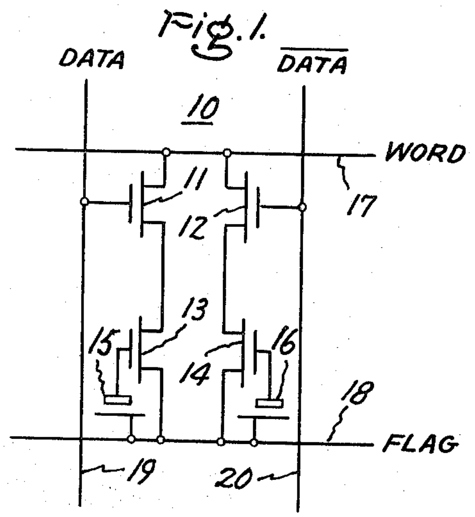
Figure 2:
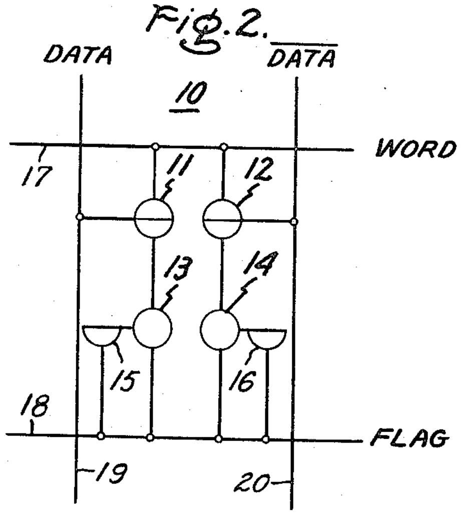

FIGS. 1 and 2 schematically illustrate a preferred embodiment of the present invention. Generally, associative memory cell 10 comprises a pair of insulated gate field effect transistors and a pair of floating gate transistors arranged symmetrically within the memory cell. Memory cell 10 further comprises a voltage variable capacitor connected between the floating gate and the source of each of the floating gate transistors. Memory cell 10 is capable of write, associative search, associative search with mask, and in one embodiment, memory cell 10 is further capable of erasing.

FIGS. 1 and 2 illustrate the same electrical connections for memory cell 10. FIG. 1 utilizes more or less conventional semiconductor symbolism whereas FIG. 2 utilizes what is known as "bubble" symbolism which enables large arrays to be more easily illustrated. Both figures illustrate the same circuit and like elements bear the same reference number.

Specifically, memory cell 10 comprises two insulated gate field effect transistors 11 and 12 and two floating gate field effect transistors 13 and 14. Transistors 11 and 13 have their source-drain paths series connected between WORD and FLAG lines 17 and 18 respectively. Similarly, transistors 12 and 14 have their source-drain paths series connected between WORD and FLAG lines 17 and 18, respectively. The gate of transistor 11 is connected to a DATA line. The gate of transistor 12 is connected to a $\overline{\text{DATA}}$ line.

Thus the basic memory cell in accordance with the present invention comprises four transistors connected as described above. The operation of memory cell 10 may best be understood by also considering FIG. 3. Elements 15 and 16 shall be described in detail after the description of the operation of the basic memory cell.

Figure 3:
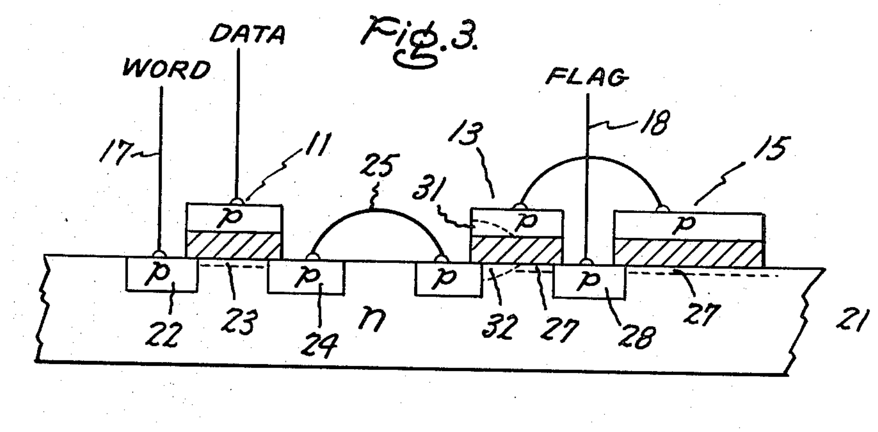
FIG. 3 illustrates the operation of a memory cell in accordance with the present invention.

FIG. 3 illustrates a cross-section of the left-hand side of memory cell 10 as it may appear on a semiconductor chip. As illustrated in FIG. 3, transistors 11 and 13 comprise p-channel field effect transistors formed in an n-type conductivity substrate 21. It should be understood however that n-channel field effect transistors are equally suitable for the present invention. The series path from WORD line 17 to FLAG line 18 comprises WORD line 17, drain 22, p-channel 23 (assuming transistor 11 is turned on), source 24, connection 25, drain 26, p-channel 27 (assuming transistor 13 is turned on), source 28, and FLAG line 18.

As illustrated in FIG. 3, the gate material for transistors 11 and 13 comprises a semiconductor, for example, p-type conductivity silicon. In an alternative embodiment of the present invention the gate material for the transistors in memory cell 10 may comprise a metal, for example, molybdenum.

The overall operation for memory cell 10 is as follows. Writing is accomplished by the avalanche injection of charge from substrate 21 to the gate of one of the floating gate transistors. This is accomplished by applying a large negative pulse to WORD line 17, thereby enabling the writing in all of the cells connected to WORD line 17. FLAG line 18 is maintained at ground potential. Whether a logic "1" or a logic "0" is written is determined by which of the DATA or $\overline{\text{DATA}}$ lines is activated with a large negative pulse. Assuming a logic 1 is to be written and is represented by charge on the gate of transistor 13, then a negative pulse is applied to the DATA line thereby turning on transistor 11. Turning on transistor 11 couples transistor 13 to WORD line 17. The large negative potential of WORD line 17 causes the formation of an depletion layer 32 underneath the gate of transistor 13. Assuming a sufficiently high negative potential is applied to WORD line 17, electrons are avalanche injected into the gate of transistor 13 and stored therein for as long as desired. As an example of typical operating parameters, a voltage pulse having an amplitude of 40 volts and a duration of 100 microseconds is sufficient to cause the avalanche injection of charge into a p-type silicon gate having a resistivity of 0.1 ohm-centimeters from a substrate having a resistance of 2-5 ohm-centimeters across an insulating layer, for example, comprising silicon dioxide, having a thickness of 1000 angstroms. These values should be considered exemplary only and not as in any way limiting since the variation of any one of the parameters stated will require some adjustment of the remaining parameters in order to cause avalanche injection to occur.

Having thus written a logic 1 in memory cell 10, this information can be associatively searched by charging FLAG line 18 and applying the searched for information to the DATA and $\overline{\text{DATA}}$ lines. If there is a match between the search for information and the information stored in memory cell 10 then a discharge path is formed from FLAG line 18 through one of the series connected source-drain paths in the memory cell to WORD line 17, which is held at ground potential.

Continuing a specific example of a stored logic 1 the application of logic 1 signals to the DATA and $\overline{\text{DATA}}$ lines (i.e. the DATA line is "high" and the $\overline{\text{DATA}}$ line is held at ground potential). Then transistor 11 is turned on and a resistive path to ground is formed for the charge on FLAG line 18 through the series connected source-drain paths of transistors 11 and 13. If a logic 0 had been stored, then transistor 13 would be in an off condition and the activation of transistor 11 would be of no effect. Thus FLAG line 18 would remain high thereby indicating a mismatch between the searched for information and the information stored in memory cell 10.

Figure 4:
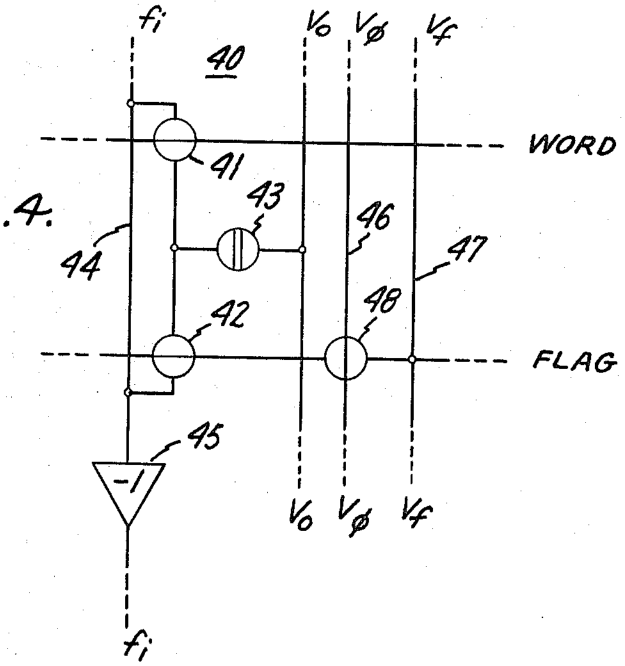
FIG. 4 illustrates OR logic and peripheral circuitry used in a memory system in accordance with the present invention.
Figure 5:
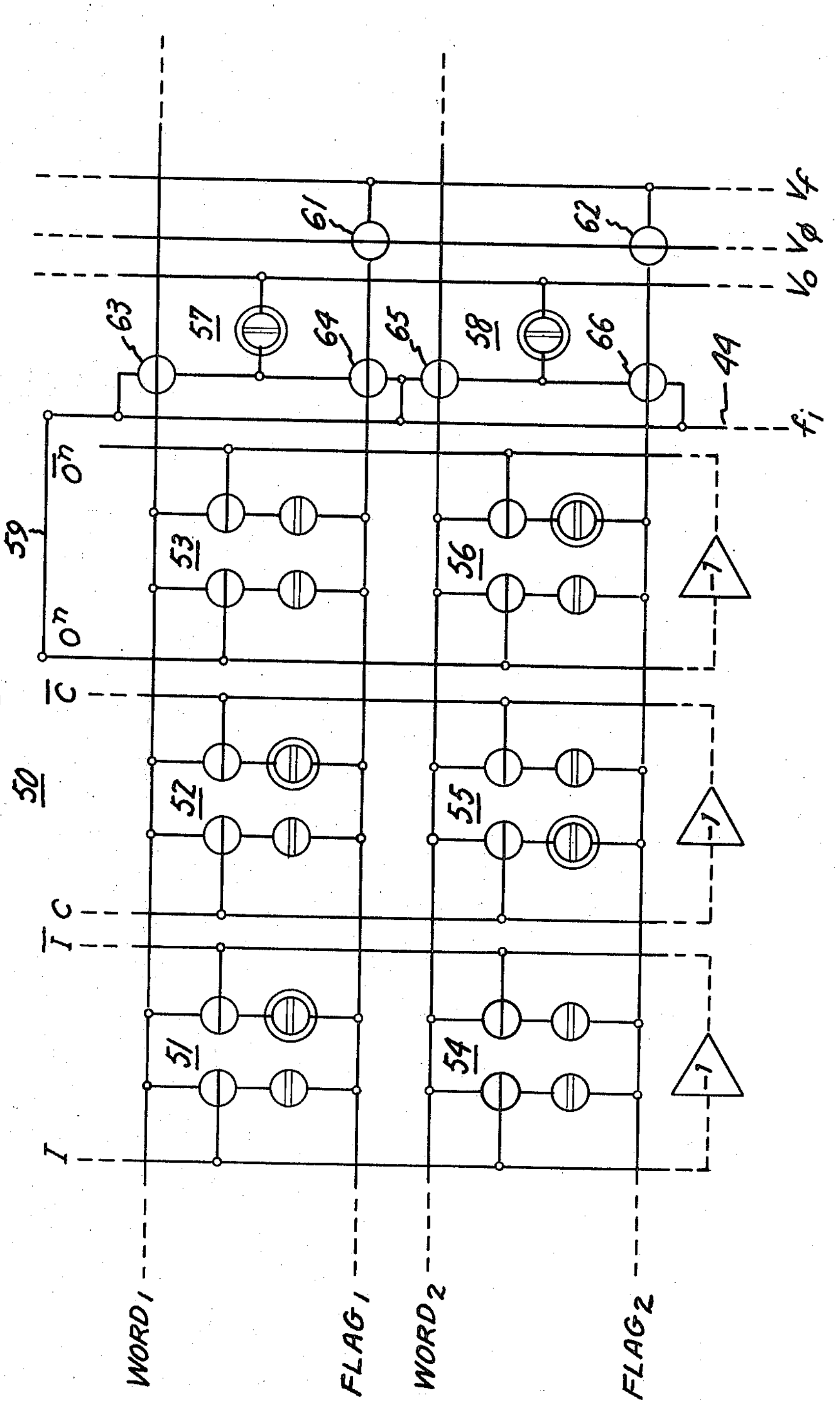
FIG. 5 illustrates a portion of a memory array as used to generate a "D-flip-flop" circuit.

Since a match causes the output to assume a low level, the logic obtained from the memory cell is negative logic, i.e., the sense of the output signal is inverted. As more fully described herein, a plurality of cells on the same WORD and FLAG lines perform the AND logic function when searched together. Strictly speaking, the function performed is NAND. However, the OR logic, described in conjunction with FIG. 4, is positive and the system described in FIG. 5 is also positive, so positive terminology is used throughout. As discussed in conjunction with FIG. 5, the negative logic of the AND function is readily accommodated so that the output signals have the proper sense.

Memory cell 10 can be erased, assuming a semiconductor gate material, by maintaining WORD line 17 at ground potential and applying a large negative pulse to FLAG line 18 while activating the DATA and $\overline{\text{DATA}}$ lines. This procedure results in the formation of a depleted region 31 in the gate of transistor 13 from which electrons are avalanche injected back to substrate 21 through the gate oxide layer.

With a metal gate, it is possible to utilize avalanche conduction to charge the gate of the floating gate transistors, which act as the storage nodes of the memory cell. However, erasure is not possible by simply utilizing signals on the access lines to the memory cell. In order to erase this type of cell, it is necessary to introduce the chip comprising the cell to an environment of either high temperature or high intensity incident radiation, during which time the contents of the cell can be erased. Since in a practical system it is not feasible to remove sections of a computer memory for erasure in this manner, it is considered simply that the memory cell is non-erasable.

As previously noted, memory cell 10 further comprises MOS voltage variable capacitor elements 15 and 16 coupled between the source and gate electrodes of transistors 13 and 14, respectively. Voltage variable capacitor elements 15 and 16 are utilized to selectively couple signals to the storage node formed by the gate of either transistor 13 or transistor 14. A detailed description of the construction and operation of these devices is given in application Ser. No. 146,966, filed May 26, 1971, and assigned to the assignee of the present invention. Briefly stated however, voltage variable capacitor elements 15 and 16 each comprise one electrode and the gate structure of a field effect transistor. The gate is connected to the gate of a "host" transistor and the electrode utilized may comprise either a separate electrode or the source or drain of the host transistor as illustrated in FIG. 3. Voltage variable capacitor 15 thus comprises an enlarged gate portion connected to the gate of the host transistor overlying a portion of source electrode 28 of transistor 13. When charge is stored on the storage node formed by the gate of transistor 13, inversion layer 27 forms in the substrate underneath the gate structure connecting the source and drain together. Inversion layer 27 also forms under the gate structure of voltage variable capacitor 15, and is coupled to source electrode 28 of transistor 13. The inversion layer forms when transistor 13 is in an active state, this is after charge has been injected from substrate 21 to the gate electrode of transistor 13 thereby turning it on. The inversion layer underneath the gate electrode of voltage variable capacitor 15 and the gate electrode itself thus form the two plates of a capacitor which then couples signals to the gate electrode of transistor 13.

However, if charge is not stored on the storage node formed by the gate electrode of transistor 13, then no inversion layer exists under the gate structure of voltage variable capacitor 15. Thus the capacitance associated with the gate structure of voltage variable capacitor 15 is greatly reduced and very little, if any, applied signal is coupled to the gate structure of transistor 13.

By virtue of voltage variable capacitor elements 15 and 16, one can selectively couple signals from FLAG line 18 to the storage nodes of memory cell 10. Transistors 13 and 14 are nontheless floating gate field effect transistors despite the connection to voltage variable capacitor elements 15 and 16. This is so because the term "floating gate" as used herein is meant to designate the fact that a resistive path does not exist between a source of charge and the gate electrode. Obviously, a capacitor does not form a resistive path.

In the operation of memory cell 10, as previously described, erasure comprises holding WORD line 17 at approximately ground potential while applying a large negative pulse to FLAG line 18 and activating transistors 11 and 12. By incorporating voltage variable capacitor elements 15 and 16, the coupling of the large negative pulse to the gate electrode is greatly enhanced thereby enabling erasure to be carried out more completely.

FIG. 4 illustrates OR-logic circuitry 40 and additional decoding circuitry as may be used in a memory array in accordance with the present invention comprising a plurality of memory cells such as memory cell 10.

OR-logic circuitry 40 comprises insulating gate field effect transistors 41 and 42, floating gate field effect transistor 43, and logic sense inverting amplifier 45. Also illustrated in FIG. 4 are additional decoding elements comprising control lines 46 and 47 and insulated gate field effect transistor 48.

Logic circuitry 40 contains as a storage node the floating gate of field effect transistor 43. Coupling transistors 41 and 42 are controlled by signals on the WORD and FLAG lines to couple logic level signals from OR-logic access line $V_0$ to OR function output line 44. By utilizing a plurality of circuits such as circuit 44 a plurality of words may be connected together in OR-logic fashion to a common output line 44. Depending upon the way the information is stored in memory cell 10, it may be necessary to include a logic sense inverting amplifier 45 to restore the output of the OR-logic circuitry to a proper logic level corresponding to the proper sense of the logic signals within the memory system. As seen in conjunction with FIG. 5, by storing the complement of the desired logic, amplifier 45 can be eliminated.

In order to activate OR-logic circuit 40 so that information on the FLAG line is transferred to line 44, control line $V_0$ is maintained at ground potential, a large negative pulse is applied to function output line 44, and the WORD line is pulsed to turn on transistor 41, thereby coupling the large negative pulse on line 44 to floating gate transistor 43. This causes charge to be injected from the substrate to the gate material of transistor 43 thereby also turning on transistor 43. It can be readily seen that by selectively activating OR-logic circuits in a given column that an OR-logic response is obtained from the selected words so connected. The storage node contained within the OR-logic circuit can be written in at the same time that the associative memory cells are written in to determine the type of logic response desired.

While illustrated in FIG. 4 in conjunction with the additional decoding elements 46–48, it should be understood that the OR-logic circuitry can be fabricated at any point in the array at which it is desired.

Decoding elements 46–48 enable the entire memory array to be erased by simultaneously applying a large negative potential to lines 46 and 47. This negative potential is on the order of −40 volts and serves to turn on insulated gate field effect transistor 48 thereby coupling all of the FLAG lines in the array to line 47. As previously noted, the application of a large negative pulse to the FLAG line of each memory cell serves to erase the contents of that memory cell by avalanche injection of charge from the storage node to the substrate of the particular floating gate field effect transistor.

FIG. 5 illustrates an example of the utilization of the present invention for generating a "D-flip-flop" type of response. A D-flip-flop has an output that is determined, in additional to the two input signals, by the state of the flip-flop at a given previous time interval. Thus, the flip-flop in a sense has three inputs, the two inputs utilized in generating an output and a memory for a prior output which is determinative of the present output. The logic function equation describing a D-flip-flop is $$O^n \cdot \bar{C} + I \cdot C + O^{n+1}$$

or the following truth table

| | I | C | $O^n$ | $O^{n+1}$ |
|---|---|---|---|---|
| 1. | 0 | 0 | 0 | 0 |
| 2. | 0 | 0 | 1 | 1 |
| 3. | 0 | 1 | 0 | 0 |
| 4. | 0 | 1 | 1 | 0 |
| 5. | 1 | 0 | 0 | 0 |

| | | | | |
|---|---|---|---|---|
| 6. | 1 | 0 | 1 | 1 |
| 7. | 1 | 1 | 0 | 1 |
| 8. | 1 | 1 | 1 | 1 |

where I is the input to the flip-flop, C is a clock pulse signal, $O^n$ is the output at the time of the clock pulse and $O^{n+1}$ is the output in the interval after the clock pulse. The clock pulse may be considered as in the nature of a "strobe" pulse, at the occurance of which the state of the input and output is noted and a new output ($O^{n+1}$) generated accordingly. Note in the above truth table that $O^n$ and $O^{n+1}$ always stay the same in the absence of a clock pulse. The result is the ability to store information for one or more clock pulse periods. As is well known, these devices can be used as a shift register when connected input to output. The clock signal is sent to all the flip-flops simultaneously, thus forming the "shift" input to the register.

In the following description of the implementation of a D-flip-flop it should be noted that the AND and OR functions are obtained simply by storing information in a predetermined pattern in the memory system. It should also be noted that the AND and OR logic function can be suitably cascaded in any desired manner to provide any suitable logic function. Thus FIG. 5 need not illustrate a peripheral portion of the array but should be considered as illustrating merely a single D-flip-flop that can be fabricated anywhere in the array by the selection of AND and OR logic circuits.

As illustrated in FIG. 5, the necessary elements comprise a plurality of memory cells numbered 51–56, two OR-logic cells 57 and 58, decoding transistors 61 and 62 and feedback path 59. In order to illustrate which of the storage nodes is storing charge so that a D-flip-flop logic response results, the floating gate transistors in an active state are encircled. Thus to obtain a D-flip-flop response a logic 1 is written in cell 55, a logic 0 is written in cells 51, 52 and 56. Both OR-logic circuits 57 and 58 are activated. Cells 53 and 54 are inactive and neither storage node within these memory cells is storing charge at the time the section of array 50 is being utilized to provide a D-flip-flop logic function. For the sake of simplicity, voltage variable capacitor elements 15 and 16 as illustrated in FIGS. 1 and 2 have been omitted. These elements may be included as desired whether array 50 comprises field effect transistors having a metallic gate material or a semiconductor gate material.

In describing the operation of array 50, the D-flip-flop will be taken through a "cycle" of combinations of input signals that represent respectively the absence of any input signal, the application of only a clock pulse, the simultaneously application of an input signal and the clock pulse, and the application of only a clock pulse with a high level output on the output of the array. This corresponds respectively to rows 1, 3, 7 and 4 as listed above in the truth table describing the logic function of a D-flip-flop.

It will be noted that a comparison of FIG. 5 with the logic function equation listed above reveals what may appear to be a discrepancy between the logic function equation and the activation of selected storage nodes within the memory cells comprising section 50 of a memory array. It will be recalled that in the description of the operation of a single memory cell the output of the memory cell is a signal whose sense is inverted relative to the logic of the array. That is, a match between the stored information and the searched for information is indicated by a discharging of the FLAG line. Stated another way, the match is indicated by having the FLAG line remain at a high level only when the searched for information is the complement of the information stored in the particular memory cell. Under these circumstances it is necessary to write the complement of the AND logic functions. In this way the input signals can be used directly and the output signals have the proper logic sense.

Also illustrated in FIG. 5 are a plurality of inverting amplifiers interconnecting for example the I and $\bar{I}$ DATA lines, the C and $\bar{C}$ DATA lines, etc. These inverting amplifiers are suitably provided at the periphery of the array and serve to generate the inverse of the DATA from one of the DATA lines. As previously noted, the OR-logic function can be provided at a plurality of locations throughout the array and should not be considered peripheral apparatus. Similarly, feedback line 59 can be utilized to selectively interconnect the output of the OR-logic function to the input of certain ones of the AND logic function associative memory cells. It should be noted that the function output signal from line 44 corresponds to the $O^{n+1}$ output indicated in the truth table and logic function equation.

Considering line 1 of the truth table, the absence of an input pulse, a clock pulse, and a low input on the $O^n$ DATA line is treated as follows during a search operation of the array to provide a logic output signal. During a search operation, the FLAG line is charged and permitted to float. The input signals applied to the DATA lines then control the access to the storage nodes to determine whether or not the searched for information matches the stored information. If there is a match then a resistive path is provided from the FLAG line to the WORD line which is held at ground potential. The discharge of the FLAG line thus indicates a match. A zero input on the I and C DATA lines corresponds to the $\bar{I}$ and $\bar{C}$ DATA lines being in a high state. This turns on the transistor corresponding to transistor 12 in each of memory cells 51 and 52 thereby providing two resistive paths from $FLAG_1$ line to $WORD_1$ line. Thus a low output is obtained on $FLAG_1$ output line thereby turning off coupling transistor 64 (coupling transistors 63 and 65 are in an off condition since $WORD_1$ and $WORD_2$ lines are at a ground level).

With respect to the word comprising memory cells 54 and 55 and 56, a high level input on the $\bar{I}$, $\bar{C}$ and $O^n$ DATA lines turns on transistor 12 in each of memory cells 54–56. However, only in memory cell 56 is the corresponding storage node also turned on. Thus in memory cell 56 a resistive path is provided from $FLAG_2$ line to $WORD_2$ line thereby discharging FLAG line and turning off coupling transistor 66. The discharge of both FLAG lines provides a low output to the function output line which is then coupled back to the $O^n$ DATA line by feedback path 59. Thus the logic of line 1 of the truth table is carried out by section 50 of a memory array.

Considering line 3 of the truth table in which only a clock pulse is applied. The application of a clock pulse results in the following input signals being applied to section 50: the I, $\bar{C}$, and $O^n$ DATA lines are at a low logic level, the $\bar{I}$, C and $\overline{O^n}$ DATA lines are at a high logic level. It can be readily seen that memory cell 51 provides a resistive path interconnecting $FLAG_1$ and $WORD_1$ lines, while memory cell 55 in the second word provides a resistive path between the $WORD_2$ and $FLAG_2$ lines. Thus low level output signals are once again obtained which turn off coupling transistors 64 and 66 thereby preventing a signal on OR-logic access line $V_0$ from being coupled through the activated floating gate transistors to function output line 44. Thus a O output is obtained as required by the logic function equation and the truth table given above.

Considering row 7 of the truth table it is assumed that a clock pulse and an input pulse occur approximately simultaneously as input signals to the array while the signal fed back on line 59 is at a low level. This pattern of input signals corresponds to DATA lines I, C and $\overline{O^n}$ being at a high level while DATA lines $\overline{I}$, $\overline{C}$ and $O^n$ are at a low level. As can be readily seen, none of the memory cells 51, 52, or 53 provide a resistive path interconnecting $FLAG_1$ line and $WORD_1$ line. Thus a high level output signal is obtained which allows coupling transistor 64 to remain on thereby coupling a high level signal from OR-logic access line $V_0$ through the floating gate transistor and coupling transistor 64 to the function output line 45. This high level is in turn coupled back by way of feedback line 59 to the $O^n$ access line. As indicated in the truth table a logic 1 is thus produced on the function output line 45.

Since OR-logic is involved it is, in a sense, immaterial what the output on $FLAG_2$ line is; i.e. a high output on either FLAG line will produce a high output on line 44. However, it is apparent that a low level output signal is produced on $FLAG_2$ line since both memory cells 55 and 56 provide a resistive path between $FLAG_2$ line and $WORD_2$ line. Therefore, transistor 66 is turned off and no signal is coupled thereby to output line 44.

Finally, to complete the "cycle," it will be assumed as in line 4 of the truth table that a clock pulse and a high input on the $O^n$ line exists. This corresponds to the following input signal levels. A high level signal is on the $\overline{I}$, C and $O^n$ DATA lines while a low level signal is on the I, $\overline{C}$ and $\overline{O^n}$ DATA lines. Under these conditions it is readily seen that memory cell 51 provides a resistive path from $FLAG_1$ line to $WORD_1$ line thereby providing a low output signal which turns off coupling transistor 64. Similarly, in the second word of section 50, memory cell 55 provides a resistive path from $FLAG_2$ line to $WORD_2$ line. Thus, neither FLAG line remains high and the function output line is returned to a low level by virtue of transistors 64 and 66 having been turned off.

Having served its function as a D-flip-flop section 50 of a memory array is erased as follows: while negative (high) voltage signals are applied to all of the DATA lines, a large negative potential is applied to the OR-logic access line $V_0$ as well as the decoding access lines $V_\phi$ and $V_f$. The large negative potential applied to $V_f$ is coupled by way of decoding transistors 61 and 62 to $FLAG_1$ and $FLAG_2$ lines, respectively. The WORD lines are maintained at ground potential. The application of these signals will result in the erasure of the charge stored on the gates of the floating gate transistors comprising the storage nodes of memory cells 51 through 56. The application of the signal to the OR-logic access line while the function output line is grounded results in the erasure of the charge stored on the gates of the floating gate transistors comprising OR-logic circuits 57 and 58. As in the writing operation, the erasure takes place by avalanche injection from the gate to the substrate material. Once section 50 is erased it can be suitably written on again to make up any type of logic circuit as desired.

Having thus described the present invention it will be apparent to those of skill in the art that various modifications can be made within the spirit and scope of the present invention. For example, as previously noted, the memory cell of the present invention can be fabricated utilizing n-channel field effect transistors. If this were done, a "high" signal would be positive. Further, it should be noted that the feedback lines and OR-logic can be placed anywhere within the array and that the array can be segmented as desired to provide more than one word on what would otherwise be a one word line. As previously noted, the information as stored need not be complementary so as to provide positive logic sense output signals. In memory cells where the information is to be written once and not erased (as with metal gate field effect transistors), the voltage variable capacitance elements can be eliminated if desired.

Further, it should be noted that while the memory cell of the present invention is described in conjunction with a unique universal logic system that it enables, the memory cell of the present invention can also be utilized in conventional associative memory fashion. That is, an array of memory cells such as memory cell 10 need not be written on and then utilized as universal logic but may simply be utilized as an associative memory system in which information applied to the DATA lines is searched and matched with stored information within the array.

What we claim as new and desired to secure by Letters Patent of the United States is:

1. An associative memory cell comprising:

a pair of floating gate transistors, each having a source, gate and drain electrode, the gates of said floating gate transistors forming first and second storage nodes;

a pair of field effect transistors each having source, drain and gate electrodes;

first, second, third and fourth access lines;

one of said floating gate transistors and one of said field effect transistors having the source-drain paths thereof series connected and connected between said first and second access lines, the gate of said field effect transistor being connected to said third access line; and the other of said floating gate and field effect transistors also having the source-drain paths thereof connected together and connected between said first and second access lines, the gate of said other field effect transistor being connected to said fourth access line.

2. The associative memory cell as set forth in claim 1, wherein the gate material of said floating gate transistors comprises a metal.

3. The associative memory cell as set forth in claim 2 wherein said metal comprises molybdenum.

4. The associative memory cell as set forth in claim 2 and further comprising:

bias means connected to said access lines for avalanche injecting electric charge onto one of the gates of said floating gate transistors.

5. The associative memory cell as set forth in claim 1 wherein the gate material of said floating gate transistors comprises a semiconductor.

6. The associative memory cell as set forth in claim 5, wherein said semiconductor comprises silicon.

7. The associative memory cell as set forth in claim 5 and further comprising:

bias means connected to said access lines for writing and erasing information in the form of an avalanche injected electric charge.

8. The associative memory cell as set forth in claim 5 and further comprising:

voltage variable capacitance means, coupled between said storage nodes and one of said first and second access lines, for selectively coupling signals to said storage nodes.

9. An associative memory system capable of generating arbitrary Boolean functions comprising:

an array of associative memory cells arranged in bits and words, wherein each bit comprises one cell and each word comprises a plurality of bits for performing the AND function according to the information stored in the cells comprising that word;

at least one OR-logic output line; and a plurality of OR-logic cells for selectively connecting a plurality of words to said OR-logic output line.

10. The associative memory system as set forth in claim 9 and further comprising:

at least one feedback path for connecting said OR-logic output line to selected bits of different words in said array.

11. The associative memory system as set forth in claim 10 wherein said feedback path includes means for inverting the sense of the signal on said OR-logic output line.

12. The associative memory system as set forth in claim 9 wherein each memory cell of said array comprises:

a pair of floating gate transistors, each having a source, gate, and drain electrodes, the gates of said floating gate transistors forming first and second storage nodes;

a pair of field effect transistors each having source, drain and gate electrodes;

first, second, third and fourth access lines;

one of said floating gate transistors and one of said field effect transistors having the source-drain paths thereof series connected and connected between said first and second access lines, the gate of said field effect transistor being connected to said third access line; and the other of said floating gate and field effect transistors also having the source-drain paths thereof connected together and connected between said first and second access lines, the gate of said other field effect transistor being connected to said fourth access line.

13. The associative memory system as set forth in claim 12 wherein each OR-logic cell comprises:

an OR-logic access line;

a pair of coupling transistors, each having source, gate and drain electrodes, the gate of one coupling transistor connected to said first access line and the gate of the other coupling transistor coupled to the second access line, the drains of said coupling transistors being connected together and to said OR-logic output line, the sources of said coupling transistors being connected together; and a third floating gate transistor having source, gate, and drain electrodes, the source of said third floating gate transistor being connected to said OR-logic access line and the drain of said third floating gate transistor being connected to the sources of said coupling transistors.

14. The associative memory system as set forth in claim 12 and further comprising:

voltage variable capacitance means, connected between said storage nodes and one of said first and second access lines, for selectively coupling signals to said storage nodes.

* * * * *